J. Evans.
Piles for Making Railroad Car Wheels.
Nº 16,724.          Patented Mar. 3, 1857.
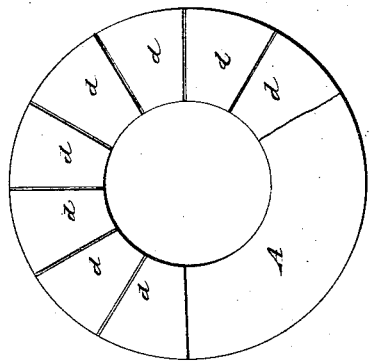
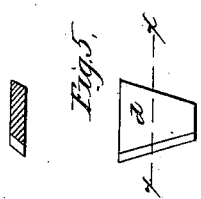
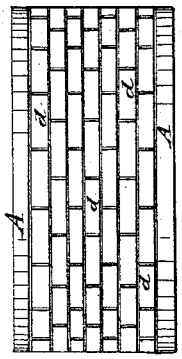
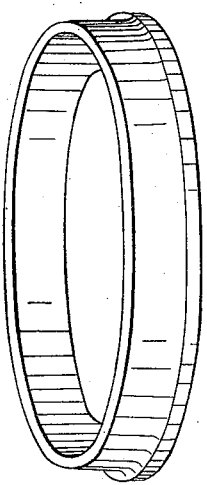
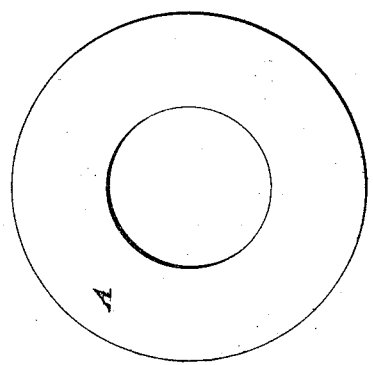

UNITED STATES PATENT OFFICE.

JAMES EVANS, OF PORTSMOUTH, OHIO.

MAKING TIRES FOR RAILWAY-CAR WHEELS.

Specification of Letters Patent No. 16,724, dated March 3, 1857.

*To all whom it may concern:*

Be it known that I, JAMES EVANS, of Portsmouth, in the county of Scioto, in the State of Ohio, have invented an Improved Mode of Manufacturing Wrought-Iron Tires or Bands for Railroad-Car Wheels, Locomotives, and other Purposes; and I do hereby declare that the following is a full and exact description thereof, reference being had to the accompanying drawings and letters of reference marked thereon.

The nature of my invention consists in manufacturing wrought iron tires or bands for railroad car wheels, locomotives, and other purposes by cutting flat bars of iron into convenient length to be determined by the circumference and weight of the tire or band to be manufactured sufficiently tapering on the sides to form when a number of said pieces are placed in proper position touching each other, the small or taper end inclining toward the center, a ring or circle, and by piling the rings or circles thus formed upon the top of each other carefully breaking the joints in each case, obtain a pile sufficient to manufacture the tire or band of the desired circumference and weight. And thus out of the pile thus formed after placing the same between the rings of sufficient circumference to contain the pile, where the same is sufficiently heated in a heating furnace, by welding it together under the hammer and hammering or rolling the same out, thereby reducing the thickness of the rim and enlarging or expanding the circumference, the tire or band is completed.

Of the accompanying drawings, Figure 1 represents the ring (A) used for the top and bottom in piling the iron—the purposes of which are to confine the segments or cuttings of iron in their proper position when piled up and while undergoing the heating process and for affording a smooth surface to the tire or ring when completed. Fig. 2 represents the bottom ring (A) upon which is commenced the pile and shows in what position the segments or cuttings of iron (*d*) (*d*) (*d*) (*d*) are to be placed, in order to form the ring or circle. Fig. 3 represents the circular pile with an open space in the center all complete and ready for the heating and forging process. The letters (A) (A) on the rings used for the top and bottom of the pile and (*d*) (*d*), &c., are the segments or cuttings of iron properly arranged so as to form separate circles or rings one upon the top of the other breaking the joints, &c. Fig. 4 represnts the top view of one of the segments or cuttings of iron (*d*) showing its shape when prepared for piling. Fig. 5 is the end view of the same. Fig. 6 represents the tire or band after the pile (Fig. 3) is heated, welded, and forged, or rolled into its proper circumference.

To enable others skilled in the art to make and use my invention I will proceed to describe its mode of construction and operation.

I take an ordinary bar of iron, say 6 inches wide and 1 inch thick more or less according to the circumference and weight of the tire or band to be manufactured, and cut the same crosswise into tapering pieces, say 6 inches broad at the wide end and $2\frac{3}{4}$ inches at the narrow, or about in that proportion, so as to form when placed in proper position a circle; and when a sufficient number of pieces are thus prepared, I provide two rings one for the top and the other for the bottom of the pile of the same circumference as the circular pile to be formed. I then commence to build up the circular tubular pile by placing said pieces of cut iron around upon said bottom ring in the proper position so as to form an unbroken circle, and when one circle is completed, I pile on a second, third, fourth, and so on, being careful to break the joints until a pile of sufficeint weight is obtained, and then upon the top of the whole I place the top ring. If it is necessary to form a flange to the tire or band, the bars out of which the pieces are cut should vary slightly in width, so as to increase sufficiently the circumference of the pile as it is built up and the top ring should in that event be made large enough to cover the top of the pile. I then place the circular tubular pile thus formed into a heating furnace and when the pile is brought to a welding heat I take it out of the furnace and place it under a heavy forge hammer and there work it until a complete weld is obtained. The hammer and anvil should be provided with a beak somewhat after the fashion of that used by a blacksmith. After the welding process is completed I place the ring or circle again into a heating furnace, and when the same is sufficiently heated I place it either again under the hammer or in suitable rolls, and then hammer or roll it out into the tire or band of the desired circumference.

What I claim as my invention and desire to secure Letters Patent for is—

The use of the rings (A) (A) in connection with the segments of iron as herein described, the same being cut and piled and prepared for forging in the manner set forth for making tires for railroad car wheels, locomotives, and other purposes.

JAMES EVANS.

Witnesses:
O. F. MOON,
JAS. PECK.